March 18, 1958 C. R. BINNER ET AL 2,827,429
COOLED NEUTRONIC REACTOR
Filed June 30, 1952 4 Sheets-Sheet 1

Inventors:
Christian R. Binner
Charles B. Wilkie
By: Roland A. Anderson
Attorney March 18, 1958 C. R. BINNER ET AL 2,827,429
COOLED NEUTRONIC REACTOR
Filed June 30, 1952 4 Sheets-Sheet 2

Inventors:
Christian R. Binner
Charles B. Wilkie
By: Roland A. Anderson
Attorney March 18, 1958 C. R. BINNER ET AL 2,827,429
COOLED NEUTRONIC REACTOR
Filed June 30, 1952 4 Sheets-Sheet 4

Inventors:
Christian R. Binner
Charles B. Wilkie
By Roland A. Anderson
Attorney.

United States Patent Office 2,827,429
Patented Mar. 18, 1958

2,827,429

COOLED NEUTRONIC REACTOR

Christian R. Binner, Highland Park, Ill., and Charles B. Wilkie, East Point, Ga., assignors to the United States of America as represented by the United States Atomic Energy Commission Application June 30, 1952, Serial No. 296,332

3 Claims. (Cl. 204—193.2)

The present invention relates to neutronic reactors, and to neutronic reactors employing cooling means.

The neutronic reaction occurring when a neutron strikes an atom of fissionable material and divides the atom by the process called fission, liberates a large quantity of energy which partially appears in the form of heat. The heat liberated by the fission process may be used as the medium for conveying the energy of fission to devices for accomplishing work, or it may merely be considered an undesirable product which must be removed in order to prevent deterioration of the structure of a neutronic reactor. In either event, a means must be provided to cool a neutronic reactor, especially if the power level of the reactor is significant.

Many neutronic reactors have been devised using different types of cooling mechanisms. In general, it has been found that a coolant must be forced through the reactor under pressure in order to remove from the reactor a sufficient quantity of heat to maintain the temperature of the reactor structure within permissible limits. Various coolant mediums have been employed for this purpose. It is necessary, however, that the coolant medium have satisfactory nuclear properties, as well as the usual desirable thermal properties, since the coolant will be disposed within the region in which the neutron chain reaction is occurring. Generally, the most important nuclear property which must be possessed by a coolant medium is that it must have a relatively low neutron capture cross section. It is also very desirable that the coolant medium be stable in the presence of neutron and radiation bombardment. Suitable coolants and the desirable properties for reactor coolants are discussed in the patent application of Enrico Fermi and Leo Szilard, Serial Number 568,904, filed December 19, 1944, now Patent No. 2,708,656, dated May 17, 1955.

Many neutronic reactors have been constructed in which a fluid coolant is flowed through the active portion of the reactor. One such reactor is described in the patent application of Eugene P. Wigner and Charles C. Creutz, Serial Number 293,104, filed June 12, 1952, in which air is introduced into a gap centrally disposed within the active portion of the reactor and flows outwardly through the active portion thereof. The patent application of Robert W. Powell, Serial Number 287,822, filed May 15, 1952, now abandoned, discloses a similar reactor in which the loss of neutrons from the active portion of the reactor through the gap is reduced.

However, the reactors presently known to the art merely cool the active portion of the reactor. As a result, the heat generated within the active portion of the reactor is partially conducted to the shield surrounding the active portion. Many shielding materials deteriorate as a result of prolonged operation at an elevated temperature. Such a material is concrete, which is widely used for shielding purposes in neutronic reactors. Other hydrogenous materials, such as paraffin, have also been used, and generally will also deteriorate if operated for prolonged periods of time at elevated temperatures.

Hence, it is an object of the present invention to provide a neutronic reactor in which not only the active portion of the reactor is cooled by a fluid coolant, but also the shield of the reactor.

Another object of the present invention is to provide a neutronic reactor in which both the shield and the active portion of the reactor are cooled by the same flow of fluid coolant, thereby conserving equipment necessary to circulate a fluid coolant.

The present invention may clearly be practiced with a reactor operating with neutrons of any energy and using any type of fluid coolant, but for simplicity, the drawings illustrate the present invention in the form of an air cooled neutronic reactor in which the reaction occurs with neutrons of predominantly thermal energy. In the drawings.

Figure 1:
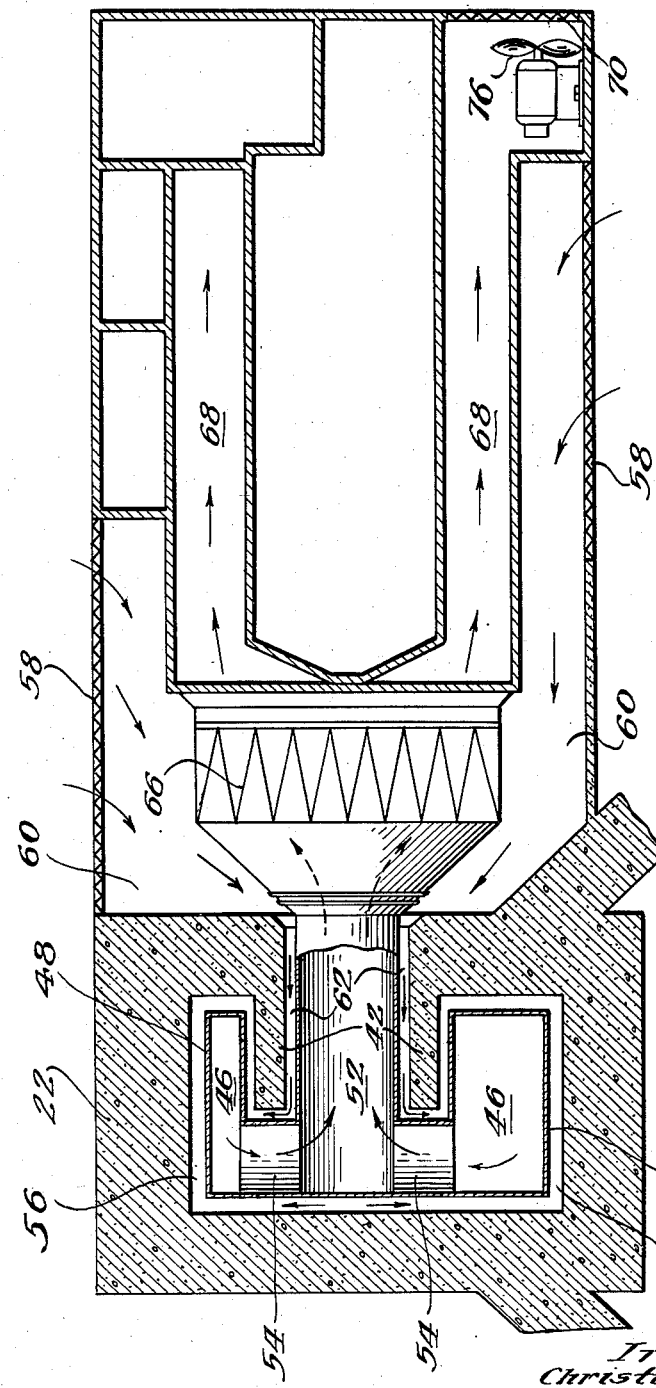
Figure 1 is a horizontal sectional view of a neutronic reactor illustrating the present invention taken along line 1—1 of Figure 4.
Figure 6:
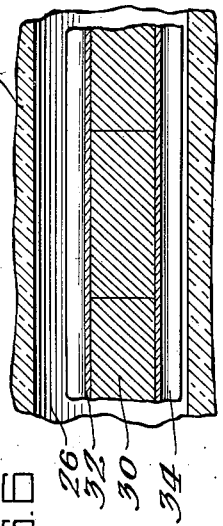
Figure 6 is an enlarged fragmentary sectional view of a portion of the active portion of the reactor as illustrated in Figure 3 taken along line 6—6 of Figure 5.
Figure 5:
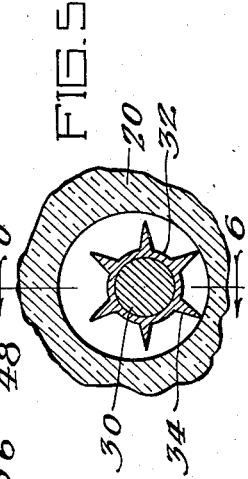
Figure 5 is an enlarged fragmentary sectional view of a portion of the active portion of the neutronic reactor.
Figure 2:
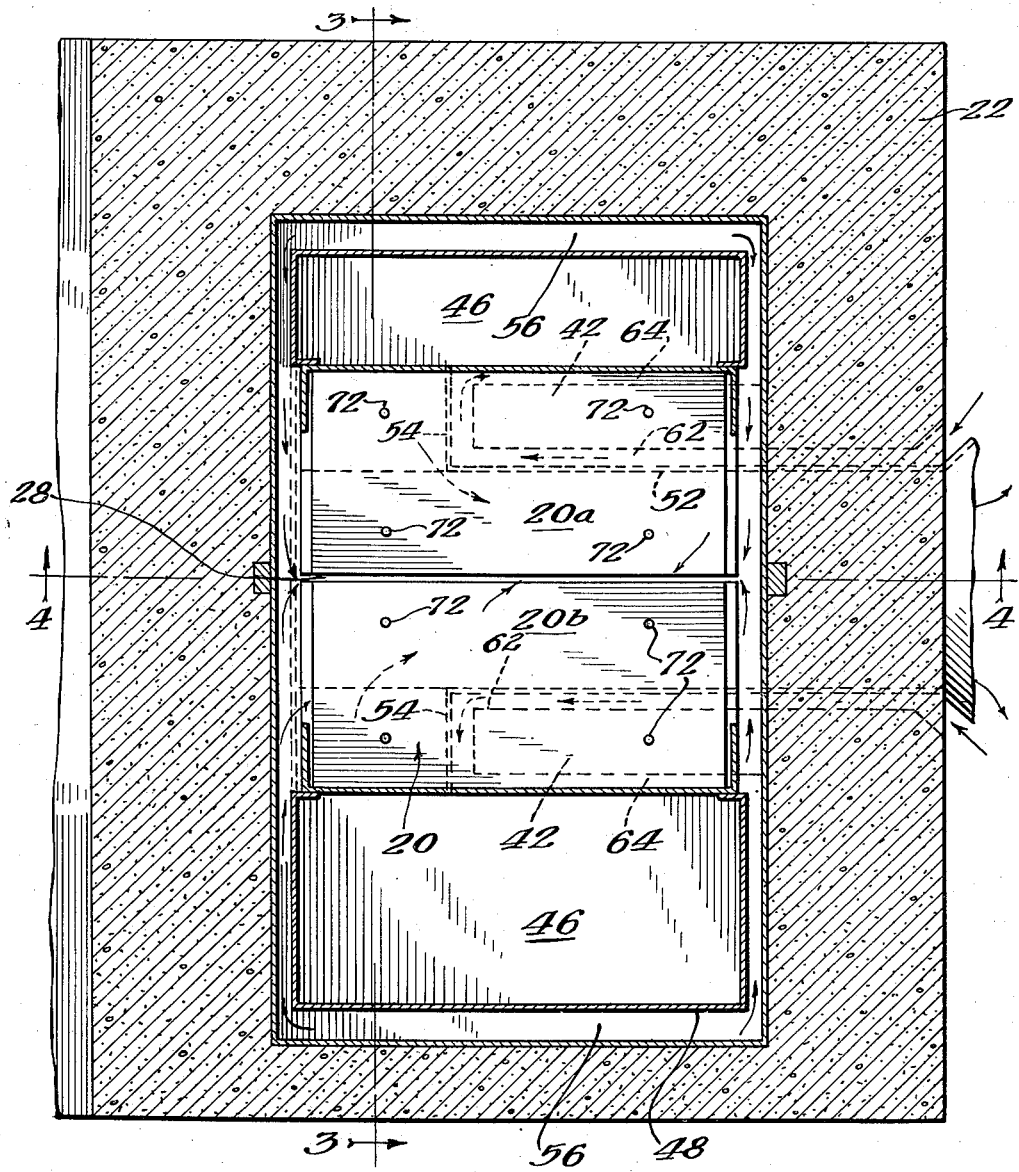
Figure 2 is a horizontal sectional view of the neutronic reactor shown in Figure 1 taken along line 2—2 of Figure 4.

The neutronic reactor shown in the figures has an active portion 20 disposed in a generally rectangular portion of a cavity in a shield 22. The active portion of a neutronic reactor is the region thereof in which the neutron chain reaction occurs, and contains the material fissionable with neutrons of thermal energy. The shield 22 may be constructed in the manner known to the art, any relatively dense hydrogenous material, such as concrete, having been found to be satisfactory. The active portion 20 of the reactor is the portion of the reactor in which the fissionable material is disposed, and includes a moderator 24 provided with coolant channels 26. The active portion 20 of the reactor is divided into equal portions 20a and 20b by a gap 28 which traverses the center of the active portion 20 of the reactor. The coolant channels 26 extend through the two portions 20a and 20b of the reactor normal to the gap 28.

The moderator may be constructed of a number of suitable materials, one particularly suitable material being graphite. In general, a suitable moderator material for a reactor using natural uranium as the fissionable material is one having a "moderating ratio" greater than that of water, the term "moderating ratio" being defined by the expression $$\frac{\sigma_s \xi}{\sigma_a}$$

where $\sigma_s$ is the neutron scattering cross section of the moderating material, and $\sigma_c$ is the neutron capture cross section for the material, and $\xi$ is the mean logarithmic energy loss per neutron collision within an atom of the material.

The thermal neutron fissionable material used in the reactor is in the form of bodies 30 which are disposed within containers 32. The containers 32 are provided with fins 34 and rest within the coolant channels 26. The containers 32 may be secured within the coolant channels 26 by conventional means if the force exerted upon the containers 32 by the fluid coolant is excessive. In the present reactor, natural uranium may be used for the bodies 30 of fissionable material. The container 32 may be constructed of aluminum, zirconium, or other material having suitable mechanical properties and a small neutron capture cross section.

The entire active portion 20 of the reactor is supported upon a series of spaced I beams 36. The I beams 36 are disposed normal to the gap 28 through the active portion 20 of the reactor, so that air may flow across the bottom surface of the active portion 20 of the reactor and into the gap 28.

Figure 3:
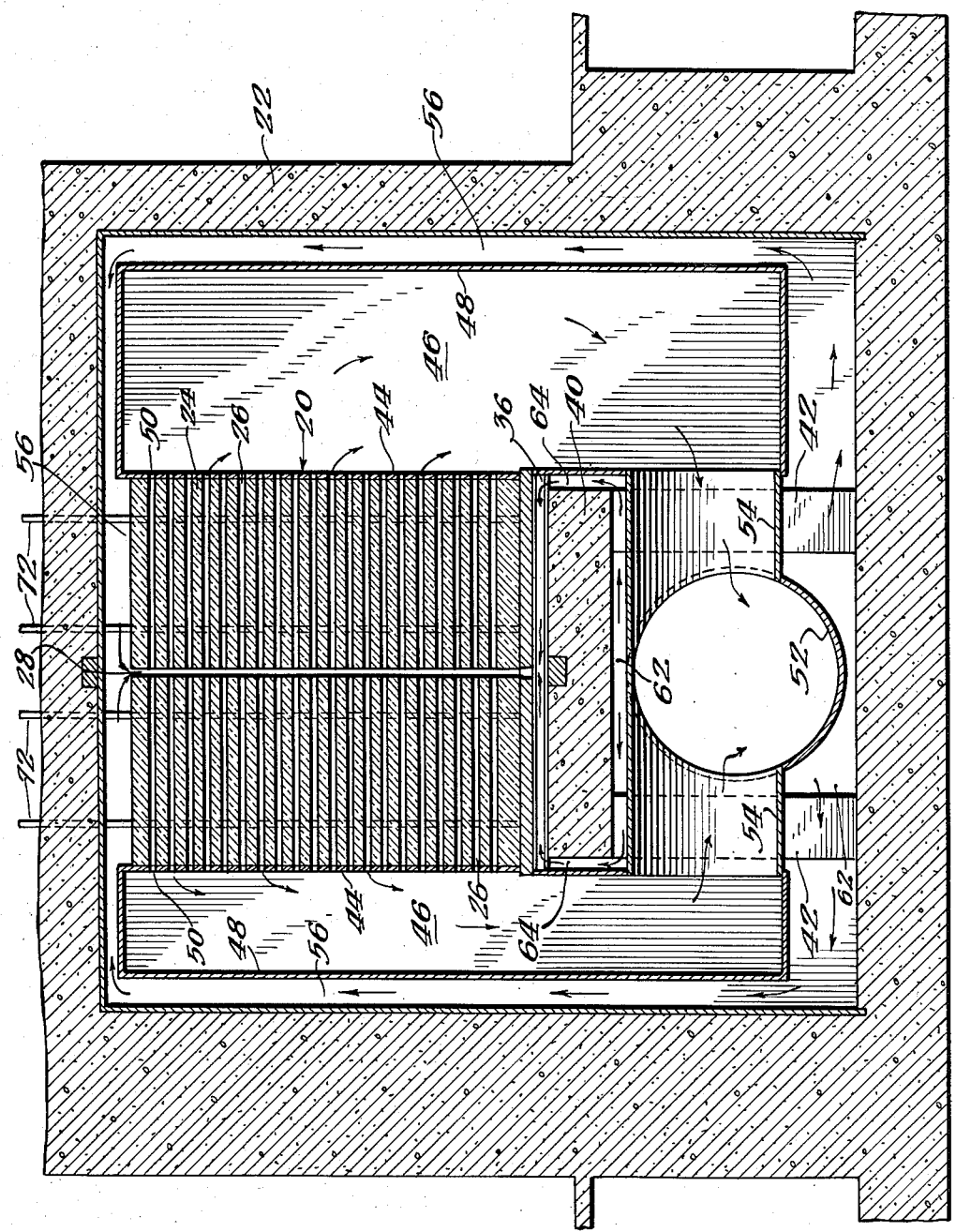
Figure 3 is a vertical sectional view of the reactor taken along line 3—3 of Figure 2.
Figure 4:
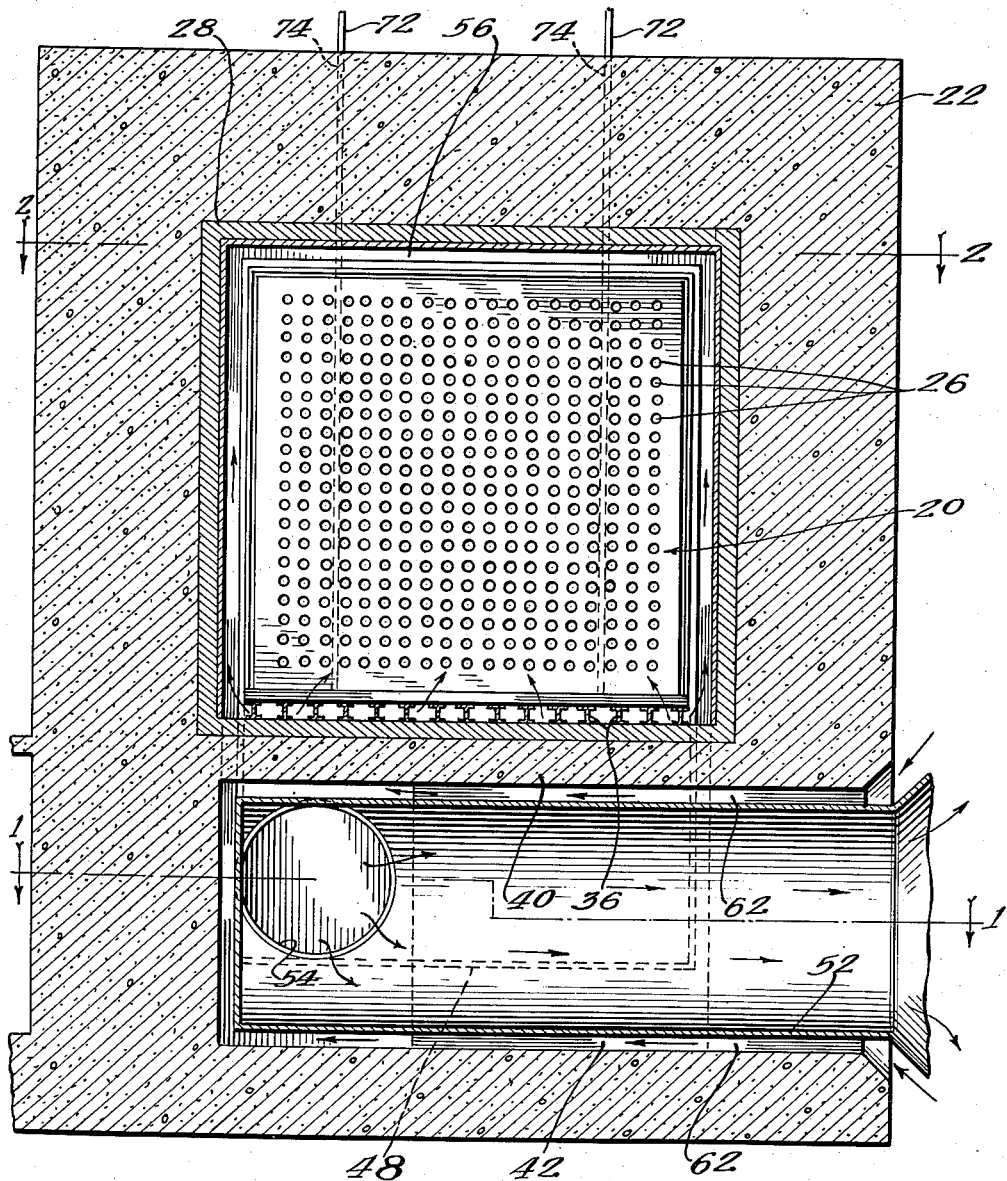
Figure 4 is a vertical sectional view of the reactor taken along line 4—4 of Figure 2.

The active portion 20 of the reactor is mounted upon a concrete slab 40 disposed beneath the I beams 36. As indicated in Figure 4 the concrete slab 40 is a portion of the shield 22 and forms a continuous surface across the bottom of the active portion 20 of the reactor in the direction normal to the I beams 36. A pair of concrete walls 42 are disposed beneath the slab 40 forming an essentially square passage and supporting the slab. As illustrated in Figure 3, the cavity extends downwardly from the edges of the slab 40 in a direction parallel to the I-beams 36 forming depending troughs.

The channels 26 of the active portion 20 terminate at faces 44 called the exhaust faces of the active portion 20 of the reactor. Adjacent to the exhaust faces 44 and sealed thereto are chambers 46 formed by means of closures 48. The closures 48 may be constructed of any non-porous material capable of withstanding large amounts of heat and mechanically and chemically stable, such as steel. Apertures 50 are provided in the closures 48 for each of the channels 26.

An exhaust pipe or duct 52 is disposed between the concrete walls 42, the concrete slab 40, and the shield 22 of the reactor. The exhaust pipe 52 is connected to each of the exhaust chambers 46 by means of connecting pipes 54 which are sealed to the closures 48. An air duct 56 is provided between the exhaust chambers 46 and the shield 22 of the reactor.

The coolant air for the reactor enters the reactor through filters 58, as shown in Figure 1. The air then travels through channels 60 to a gap 62 between the concrete walls 42, the concrete slab 40, and the reactor shield 22 and the exhaust pipe 52. The air then flows through the air ducts 56 between the closures 48 and the shield 22 to the active portion 20 of the reactor. Ducts 64 are also disposed between the concrete slab 40 and the enclosures 48 and a portion of the air will flow from the gap 62 through the ducts 64 to the active portion 20 of the reactor. The air must then flow across the surfaces of the reactor to the central gap 28 through the active portion 20 of the reactor. From the central gap 28, the air divides and flows through the two portions 20a and 20b of the active portion 20 and outwardly through the channels 26. The exhausted air from the reactor is then collected in the exhaust chambers 46 adjacent to the exhaust faces 44, and flows through the connecting pipe 54 to the exhaust pipe 52.

A heat exchanger 66 is disposed within the exhaust pipe 52 and removes some of the heat from the exhaust air which may be used to perform work. The exhausted air then flows through exhaust channels 68 and is exhausted to the atmosphere by a vent 70. Exhaust fans, diagrammatically illustrated at 76 in Figure 1, supply the energy for circulating the coolant air.

It is thus clear, that the coolant air is first circulated between all portions of the exhaust system of the reactor and the shield 22 in order to cool the shield 22. The air is then introduced across six of the eight faces of the active portion 20 of the reactor and flows into the central gap 28 to cool the reactor. In this manner, the deterioration of the concrete shield 22 as a result of prolonged operation at excessive temperatures has been virtually eliminated.

In one embodiment of the present invention, the active portion 20 of the reactor is constructed of two equal sized parallelepipeds which together form a cube 25 feet long on a side. The coolant channels 26 are disposed in a rectangular lattice, each channel being spaced from the nearest adjacent channels by a distance of 8 inches. The area of the coolant channels 26 is 5.6 square inches, and the diameter of the natural uranium fissionable bodies 30 within the channels is 1.1 inches. The uranium used in the bodies 30 is carefully refined to remove impurities having large neutron capture cross sections. Such elements as boron cadmium indium, and some of the rare earths have been reduced to less than $10^{-6}$ grams per gram of uranium. The containers 32 and container fins 34 are constructed of aluminum, the total volume of aluminum to the volume of uranium being 0.2. The central gap 28 between the two portions 20a and 20b of the active portion 20 measures 2.75 inches.

The neutronic reactor operates with a maximum temperature of the uranium bodies 30 of 350° C. the exit air being approximately 200° C. Approximately 270,000 cu. ft. of air per minute flows through the active portion 20 of the reactor permitting a neutron flux $4 \times 10^{12}$ neutrons per square centimeter second, which corresponds to a power output of approximately 28,000 kilowatts.

Two types of graphite are used in the reactor. The central core of the active portion of the reactor is constructed of the first type of graphite, a cube of approximately 18.5 feet on a side being of this material. The diffusion length for thermal neutrons of the first type of graphite, i. e., the most probably length a thermal neutron will travel in the medium before being absorbed, has been found to be 52 centimeters. The remainder of the reactor is constructed of the second type of graphite with a diffusion length for thermal neutrons averaging 48 centimeters.

The neutronic reactor has been provided with excess reactivity in order to permit the irradiation of non-fissionable objects within the active portion 20 of the reactor. As a result, it is necessary to absorb a portion of the neutrons liberated within the active portion 20 in order to prevent the reaction from becoming explosive. For this reason, control rods 72 are slidably disposed within control rod wells 74 in the active portion 20 of the reactor. In the embodiment of the invention described above, 16 control rods 72 are used to provide sufficient control to reduce the neutron reproduction ratio by about 0.035. The neutron reproduction ratio is the ratio of the number of neutrons in one generation to the number of neutrons in the preceding generation for a reactor of finite size. Each control rod 62 is constructed of 1.75 percent boron steel and has a square cross section of 4 square inches.

The man skilled in the art will doubtless develop many modifications of the present invention from a reading of the foregoing description. For example, it is clear that the present invention is applicable to any type of fluid cooled neutronic reactor. As a result, it is intended that the scope of the present invention be not limited to the specific disclosure, but rather only by the appended claims.

What is claimed is:

1. A neutronic reactor comprising, in combination, an active portion having material fissionable by neutrons of thermal energy disposed therein and means defining a plurality of channels extending therethrough, said active portion being provided with a gap disposed therethrough normal to the channels, a pair of fluid enclosures disposed adjacent to the active portion of the reactor, said enclosures being connected to opposite ends of the channels, a radiation shield disposed about the fluid enclosures and active portion of the reactor, said shield being spaced from the enclosures and active portion, and means to flow a gaseous coolant through the reactor including in sequence means to flow the gaseous coolant through the space between the shield and enclosure, between the shield and active portion of the reactor, into the gap within the active portion of the reactor, outwardly from said gap through the channels, and into the fluid enclosures.

2. A neutronic reactor comprising, in combination, an active portion having a solid graphite moderator provided with a plurality of parallel channels extending therethrough and bodies of material fissionable by neutrons of thermal energy disposed within the channels, said active portion being provided with a centrally located gap extending therethrough normal to the channels, a pair of fluid enclosures disposed adjacent to the active portion of the reactor at opposite ends of the channels and connected to the channels, a radiation shield disposed about the fluid enclosures and the active portion of the reactor, said shield being spaced from the enclosures and active portion of the reactor, and means to flow air through the reactor, said means including a single source of air connected to the space between the fluid enclosures and the shield of the reactor, and means to pump the air from the fluid enclosures thereby circulating the air through the space between the shield and the enclosures, the space between the shield and the active portion of the reactor, the central gap, the channels extending through the reactor, and the fluid enclosures.

3. A neutronic reactor comprising a reactor shield having a square passage extending therein and a cavity having generally rectangular portion disposed above and normal to the passage, a plurality of spaced parallel I-beams disposed in the rectangular portion of the cavity normal to the passage, a generally rectangular reactor active portion disposed in the cavity on the I-beams having a central vertical gap disposed above the axis of the passage and a plurality of parallel channels extending between surfaces of the active portion normal to the gap, said surfaces being spaced from the walls of the cavity and said shield having depending troughs disposed between said surfaces of the active portion and the confronting walls of the cavity, an annular air exhaust duct disposed in the passage and spaced therefrom, a generally rectangular fluid enclosure disposed in the troughs and extending upwardly therefrom, said enclosures being secured to the confronting surfaces of the active portion and spaced from the confronting surfaces of the shield, each of said enclosures having an aperture confronting each of the channels in the active portion, connecting pipes extending between the portion of each of the enclosures disposed in the troughs of the shield and the air exhaust duct, and means to exhaust air through the exhaust duct.

References Cited in the file of this patent

UNITED STATES PATENTS

| | | |
|---|---|---|
| 1,539,924 | Waite et al. | June 2, 1925 |
| 1,636,894 | Bigelow | July 26, 1927 |
| 2,708,656 | Fermi et al. | May 17, 1955 |

OTHER REFERENCES

A General Account of the Development of Methods of Using Atomic Energy for Military Purposes, 1940–1945, by H. D. Smyth, Supt. of Documents, Washington, D. C. pp. 22, 177.

The Science and Engineering of Nuclear Power, by Clark Goodman, pub. by Addison-Wesley Press, Inc., Cambridge, Mass., 1947, pp. 297, 304, 318, 319, 320.

Atomics, February 1951, pp. 51–55 (an article on "Gleep").

Atomics, June 1951, pp. 176–180 (an article on "Bepo").